US010814276B2

(12) United States Patent
Crawford et al.

(10) Patent No.: US 10,814,276 B2
(45) Date of Patent: Oct. 27, 2020

(54) PROCESS FOR MANUFACTURING A COMPONENT FOR A CATALYTIC CONVERTER

(71) Applicant: Advanced Technology Emission Solutions Inc., Toronto (CA)

(72) Inventors: Robin Crawford, Carlisle (CA); John Douglas, Brantford (CA)

(73) Assignee: Advanced Technology Emission Solutions Inc., Toronto, Ontario (CA)

(*) Notice: Subject to any disclaimer, the term of this patent is extended or adjusted under 35 U.S.C. 154(b) by 60 days.

(21) Appl. No.: 15/650,416

(22) Filed: Jul. 14, 2017

(65) Prior Publication Data
US 2017/0312688 A1   Nov. 2, 2017

Related U.S. Application Data

(63) Continuation of application No. 13/971,247, filed on Aug. 20, 2013, now Pat. No. 9,737,851.
(Continued)

(51) Int. Cl.
*B01D 53/94* (2006.01)
*B28B 11/04* (2006.01)
(Continued)

(52) U.S. Cl.
CPC ............ *B01D 53/94* (2013.01); *B28B 11/043* (2013.01); *B28B 11/241* (2013.01); *B29D 99/0089* (2013.01); *C04B 26/02* (2013.01); *C04B 38/0012* (2013.01); *F01N 3/0222* (2013.01); *H05B 6/108* (2013.01);
(Continued)

(58) Field of Classification Search
CPC ..... B01D 53/94; B28B 11/241; B28B 11/043; B28B 19/0023; B28B 19/0038; B29D 99/0089; B29C 47/0066; B29C 47/30; B29C 47/0004; B29C 47/0028; B29C 2035/0855; C04B 38/0012; C04B 26/02; C04B 2111/0081; F01N 3/0222;
(Continued)

(56) References Cited

U.S. PATENT DOCUMENTS 5,258,334 A   11/1993   Lantz, II
6,025,013 A    2/2000   Heming et al.
(Continued)

FOREIGN PATENT DOCUMENTS

EP   0677498 A2   10/1995
EP   1486242 A1   12/2004

*Primary Examiner* — Sarang Afzali
(74) *Attorney, Agent, or Firm* — Stuart Wilkinson

(57) ABSTRACT

In a process for manufacturing a catalytic converter component, a ceramic unit is used that has been prepared by extruding green ceramic product through a die to form an extrusion having a honeycomb substrate structure in which tubular passages extend along the extrusion, the passages bounded by walls dividing adjacent passages from one another. The unit is obtained by cutting off a length of the extrusion and curing and firing it. The process further comprises flowing insulation material from one end of the unit into selected ones of the elongate passages, the insulating material then being cured. The passages are selected so that the cured insulation material forms an internal thermal insulating barrier between a core zone and a radially outer zone of the unit. Passages in the inner and outer zones are free of insulation material and the honeycomb structure walls include walls crossing the insulating barrier.

11 Claims, 5 Drawing Sheets

Related U.S. Application Data

(60) Provisional application No. 61/692,732, filed on Aug. 24, 2012, provisional application No. 61/733,949, filed on Dec. 6, 2012.

(51) Int. Cl.

| | |
|---|---|
| *B28B 11/24* | (2006.01) |
| *F01N 3/022* | (2006.01) |
| *C04B 26/02* | (2006.01) |
| *C04B 38/00* | (2006.01) |
| *H05B 6/10* | (2006.01) |
| *B29D 99/00* | (2010.01) |
| *B29C 48/11* | (2019.01) |
| *B29C 48/00* | (2019.01) |
| *B29C 48/30* | (2019.01) |
| *B29C 48/345* | (2019.01) |
| *C04B 111/00* | (2006.01) |

(52) U.S. Cl.
CPC ........ *B29C 48/0022* (2019.02); *B29C 48/022* (2019.02); *B29C 48/11* (2019.02); *B29C 48/30* (2019.02); *B29C 48/345* (2019.02); *C04B 2111/0081* (2013.01); *F01N 2510/02* (2013.01); *Y02T 10/20* (2013.01); *Y10T 29/49345* (2015.01)

(58) Field of Classification Search
CPC ..... F01N 2510/02; B05D 3/067; B05D 3/029; Y10T 29/49345; Y10T 29/49604; Y10T 29/496

See application file for complete search history.

(56) References Cited

U.S. PATENT DOCUMENTS

| | | |
|---|---|---|
| 7,695,796 B2 | 4/2010 | Ichikawa |
| 8,309,032 B2 | 11/2012 | Plati et al. |
| 8,686,101 B2 | 4/2014 | Egami et al. |
| 8,727,760 B2 | 5/2014 | Neubauer |
| 2007/0252310 A1 | 11/2007 | Brockway et al. |
| 2010/0050598 A1 | 3/2010 | Plati et al. |

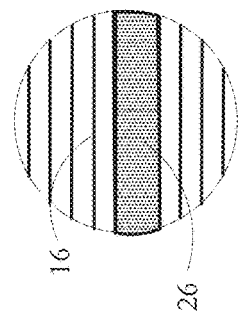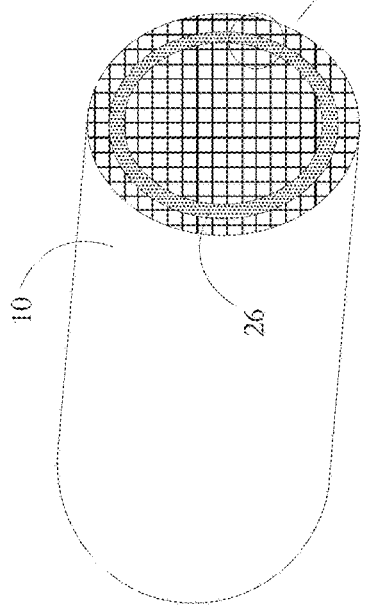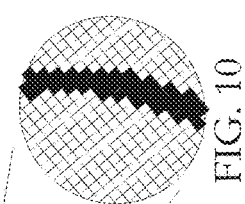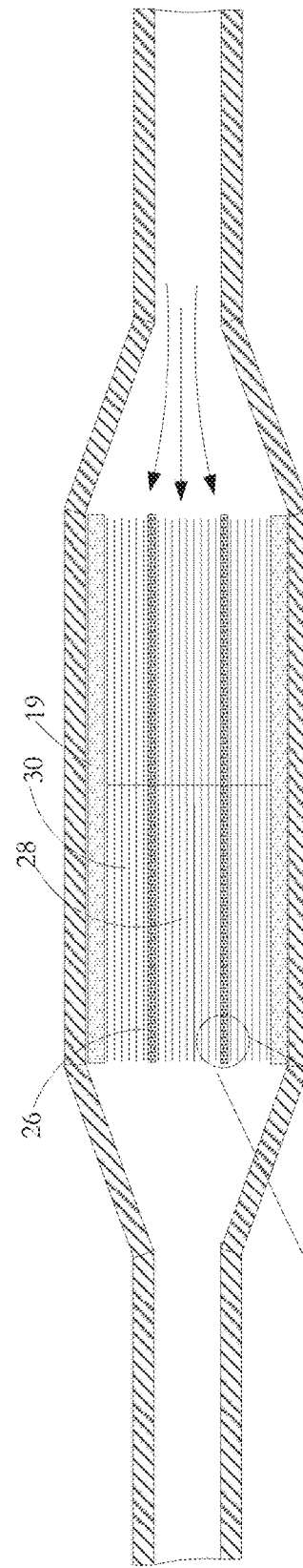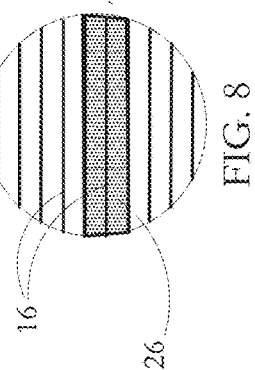

PROCESS FOR MANUFACTURING A COMPONENT FOR A CATALYTIC CONVERTER

CROSS REFERENCE TO RELATED PATENTS

The present application is a continuation application of, and claims priority from, U.S. application Ser. No. 13/971,247 filed Aug. 20, 2013 and entitled "Process for manufacturing a component for a catalytic converter" now issued as U.S. Pat. No. 9,737,851, which application claims priority under 35 USC 119(e) from U.S. Provisional Application Ser. No. 61/692,732 entitled "A catalytic converter component and process for its manufacture," filed Aug. 24, 2012, and from U.S. Provisional Application Ser. No. 61733949, entitled "A catalytic converter component and process for its manufacture," filed Dec. 6, 2012, the contents of which applications are expressly incorporated herein in their entirety by reference thereto.

FIELD OF THE INVENTION

This invention relates to processes for the manufacture of catalytic converter components for motor vehicles and to converter components made by such processes.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers are required to reduce fleet-wide greenhouse gas emissions by approximately five percent every year. Included in the requirements, for example, the new standards decreed that new passenger cars, light-duty trucks, and medium-duty passenger vehicles were to have an estimated combined average emissions level no greater than 250 grams of carbon dioxide ($CO_2$) per mile in vehicle model year 2016.

Catalytic converters are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

A catalytic converter may take any of a number of forms. Typical of these is a cylindrical substrate of ceramic material generally called a brick. The brick has a honeycomb structure in which a number of small area passages or cells extend the length of the brick, the passages being separated by walls. There are typically from 400 to 900 cells per square inch of cross-sectional area of the substrate unit and the walls are typically in the range 0.006 to 0.008 inches in thickness. The ceramic substrate is formed in an extrusion process in which green ceramic material is extruded through an appropriately shaped die and units are cut successively from the extrusion, the units being then cut into bricks which are shorter than a unit. The areal shape of the passages may be whatever is convenient for contributing to the overall strength of the brick while presenting a large contact area at which the flowing exhaust gases can interact with a hot catalyst.

The interiors of the passages in the bricks are wash-coated with a layer of the particular catalyst material. The wash-coating is prepared by generating a suspension of the finely divided catalyst in a ceramic paste or slurry, the ceramic slurry being to obtain adhesion of the wash-coated layer to the walls of the ceramic substrate. As an alternative to wash-coating to place catalyst materials on the substrate surfaces, the substrate material itself may contain a catalyst component so that that the extrusion presents catalyst material at the internal surfaces bounding the substrate passages or cells.

A catalytic converter may have a series of such bricks, each having a different catalyst layer depending on the particular noxious emission to be neutralized. Catalytic converter bricks may be made of materials other than fired ceramic, such as stainless steel. In addition, ceramic substrates may have different forms of honeycombed passages than those described above. For example, substrate cells can be hexagonal or triangular in section. In addition, if desired for optimizing strength and low thermal capacity or for other purposes, some of the extruded honeycomb walls can be formed so as to be thicker than other of the walls or formed so that there is some variety in the shape and size of honeycomb cells. Junctions between adjacent interior cell walls can be sharp angled or can present curved profiles.

The wash-coated ceramic honeycomb brick is wrapped in a ceramic fibre expansion blanket. A stamped metal casing transitions between the parts of the exhaust pipe fore and aft of the catalytic converter and encompasses the blanket wrapped brick. The casing is made up of two parts which are welded to seal the brick in place. The expansion blanket provides a buffer between the casing and the brick to accommodate their dissimilar thermal expansion coefficients. The sheet metal casing expands many times more than the ceramic at a given temperature increase and if the two materials were bonded together or in direct contact with each other, destructive stresses would be experienced at the interface of the two materials. The blanket also dampens vibrations from the exhaust system that might otherwise damage the brittle ceramic.

In use, the encased bricks are mounted in the vehicle exhaust line to receive exhaust gases from the engine and to pass them to the vehicle tail pipe. The passage of exhaust gases through the catalytic converter heats the brick to promote catalyst activated processes where the flowing gases contact the catalyst layer. Especially when the vehicle engine is being run at optimal operating temperature and when there is substantial throughput of exhaust gases, such converters operate substantially to reduce the presence of noxious gaseous emissions entering the atmosphere. It is known, however, that such converters have shortcomings at start-up when the interior of the brick is not at high temperature and during idling which may occur frequently during city driving or when stopping for a coffee at Tim Hortons. The radial transmission of heat in this and other forms of catalytic converter occurs by a combination of convection, conduction and radiation. The various heating mechanism have different effects at different converter temperatures. In particular, at low temperatures before the converter has reached optimal operating temperature, heat transfer is predominantly by convection of gases and by conduction along and through the interconnected ceramic walls. At normal operating temperature, heat transfer is predominantly by radiation generally from the core of the converter towards its periphery.

U.S. Pat. No. 8,309,032 (Plati et al.), which is herein incorporated by reference in its entirety, describes a particular form of catalytic converter component for use in an exhaust system of an internal combustion engine. The component includes a housing having a gas inlet and a gas outlet, and catalytic substrate material filling the housing. The substrate material is divided into zones that are separated from one another by an insulating barrier, the zones defining flow passages connecting the inlet and outlet for the passage of exhaust gases. In certain operating regimes, this configuration results in a reduction in heat transfer between a core zone and a surrounding zone of the component. Thus, at start up as a majority of relatively cool gases flow though a central part of the converter brick, heat tending to transfer radially outwardly from the core zone by convection and conduction is inhibited by the presence of the insulating barrier. The core of the converter component thus heats more rapidly from a cold start compared with a conventional catalytic converter without the thermal insulating barrier. When the converter component is operating at an optimal operating temperature, any heat transfer is predominantly by radiation which is affected by the insulating barrier to a much reduced extent.

A reverse effect occurs when the engine is at its optimal operating temperature, but the vehicle experiences a period of idling. At this point, the reduced level of exhaust gases passing into the converter start to localize along the converter core and also start to cool the converter down. The presence of the thermal insulating barrier means that the temporary cooling effect is localized in the core zone and is not rapidly or significantly transferred to the radially outer zone of the ceramic brick.

The Plati et al. structure promises significant improvements in lowering emissions and improving fuel mileage and precious metal catalyst savings. In particular, it means that ceramic substrates having of the order of 400 cells per square inch can achieve low emissions which, in the absence of the thermal insulation barrier, would require a substrate having of the order of 900 cells per square inch loaded with precious metal catalyst. However, the placement of an insulating barrier within a catalytic converter component presents difficult manufacturing issues.

SUMMARY OF THE INVENTION

According to one aspect of the invention, there is provided a process for manufacturing a component for a catalytic converter comprising taking a ceramic unit prepared by extruding green ceramic product through a die to form an extrusion having a honeycomb substrate structure having a plurality of tubular passages extending along the length of the extrusion, the passages bounded by walls dividing adjacent passages from one another, the unit being obtained by cutting off a length of the extrusion and curing and firing the length of extrusion, the process further comprising flowing insulation material from an end of the unit to form an internal thermally insulating barrier between a core zone of the unit and a radially outer zone of the unit, and curing the flowed insulating material using microwave radiation. The microwave radiation can be generated by at least one microwave generator arranged around the ceramic unit with the microwave radiation penetrating the insulation material from both sides of the barrier layer. During the microwave curing, insulation material expanding from the ends of the unit can be cooled and removed by machining.

Preferably, the flowing insulation material from the end of the unit is such as to at least partially fill selected ones of the passages with the insulation material. Alternatively, a part of the honeycomb structure is cut way and the flowing of the insulation material from the end of the unit is such as to at least partially fill the site of the cut away part of the honeycomb structure with the insulation material. The insulation material can be injected into the selected passages as a paste-like mixture of glass fibres, ceramic slurry, binder and water. Alternatively, the insulation material is a powder mix of glass fibres, ceramic, and binder which flows into the selected passages under gravity with vibration being applied to encourage the insulation flow and to encourage compaction of the powder in the selected passages. Preferably, the curing parameters are set so that following curing, the cured insulating material is predominantly a matrix of silica containing pores predominantly in the range 1.5 millimetres to 0.3 millimetres across.

According to an alternative aspect of the invention, the walls between selected passages are cut away to leave a chamber, the insulation material is injected or poured into the chamber before curing and then is cured by microwave curing.

Alternatively, the ceramic extrusion is extruded so as to leave sites for the thermal insulation barrier devoid of the honeycomb substrate structure, and the insulation material is injected from an end of the unit into the sites before being microwave cured.

Preferably, the extrusion has a generally circular cross-section and the passages are of square section and form a regular array. The substrate material can be a form of aluminum magnesium silicate, $Al_{14}Mg_2Si_5O_{18}$.

According to another aspect of the invention, there is provided a component for a catalytic converter comprising a unit of cured ceramic extrusion having a honeycomb substrate structure in which a plurality of passages extends along the unit, the passages bounded by walls dividing adjacent passages from one another, selected ones of the passages filled with microwave cured flowed insulation material, the microwave cured flowed insulation material forming an internal thermal insulation barrier between a core zone of the unit and a radially outer zone. The microwave cured flowed insulation material can be cured flowed mastic insulation or cured flowed powder insulation.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

FIG. 6 is a perspective view showing a ceramic substrate unit according to an embodiment of the invention;

FIG. 7 is a longitudinal section through a catalytic converter according to an embodiment of the invention;

FIG. 8 is a detail to a larger scale of the structure illustrated in FIG. 7;

FIG. 9 is a detail to the larger scale of a structure similar to the structure illustrated in FIG. 7 but constructed by an alternative process according to an embodiment of the invention;

FIG. 10 is a detail to a larger scale of part of the structure of FIG. 6;

DETAILED DESCRIPTION OF THE INVENTION INCLUDING THE PRESENTLY PREFERRED EMBODIMENTS

Figure 1:
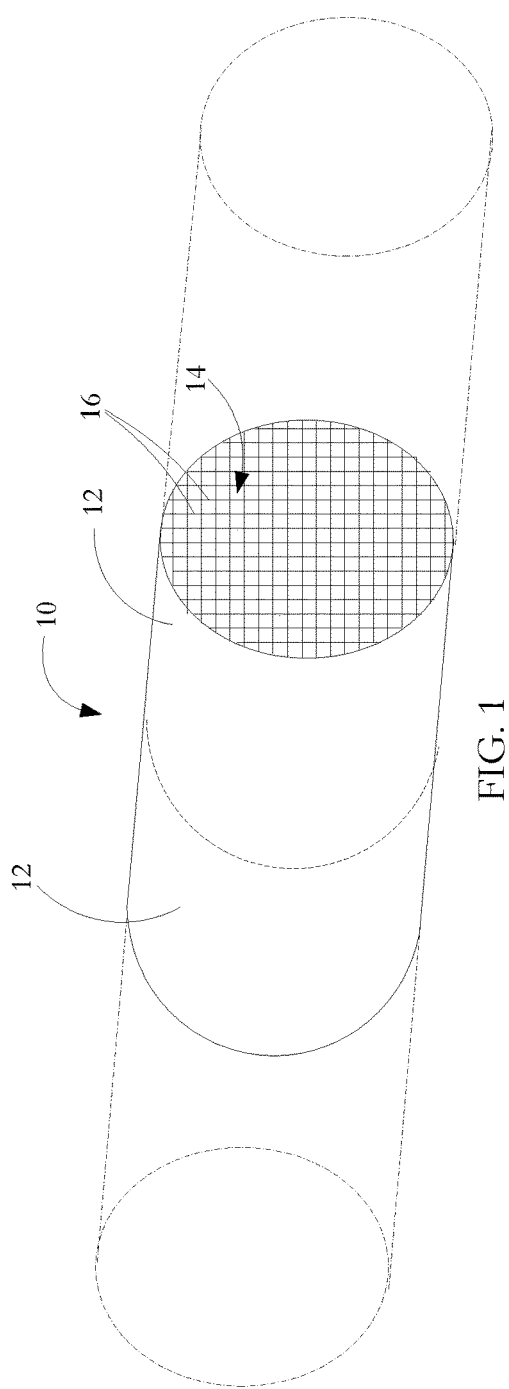
FIG. 1 is a perspective view showing a ceramic substrate unit forming part of a ceramic extrusion.

Referring in detail to FIG. 1, there is shown in perspective, part-outline view a length of extruded ceramic substrate commonly termed a unit 10, the unit consisting of two shorter lengths, termed bricks 12 that are for use as catalytic converter components. Each brick 12 has a number of tubular passages 14 extending throughout its length, the tubular passages divided by walls 16. The representation of the bricks 12 in FIG. 1 are not to scale and, across the area of a brick, there are in the range of 400 to 900 cells per square inch with wall thicknesses being of the order of 0.006 to 0.008 inches. The length of a brick 12 is generally of the order of 3 inches but a brick may be shorter depending on how it is to be loaded with catalyst material as will be described presently. Such brick designs are well-known in the catalytic converter art. Extrusion dies (not shown) for the ceramic honeycomb extrusion are designed to take a single flow source from an extruder and split the flow into a substrate having a cell density in the required range of 400 to 900 cells per square inch. Because friction generated in the die produces high back pressures on the back side of the die, the ceramic material is extruded in a relatively soft green state. A suitable ceramic material for the substrate is cordierite, which is a form of aluminum magnesium silicate $A_{14}Mg_2Si_5O_{18}$. It has a low thermal expansion coefficient, moderately high strength, and low cost which makes it a favored choice for the substrate component of catalytic converter components. Alternative substrate materials can also be used. For example, silicon carbide may be advantageously used for certain high temperature or diesel applications. The substrates are produced by extruding paste-form, green ceramic paste through an extrusion die. Units are cut from the extrusion as it emerges from the die. The units are then kiln dried and fired to a sintering temperature of the order of 1300 degrees C.

Figure 2:
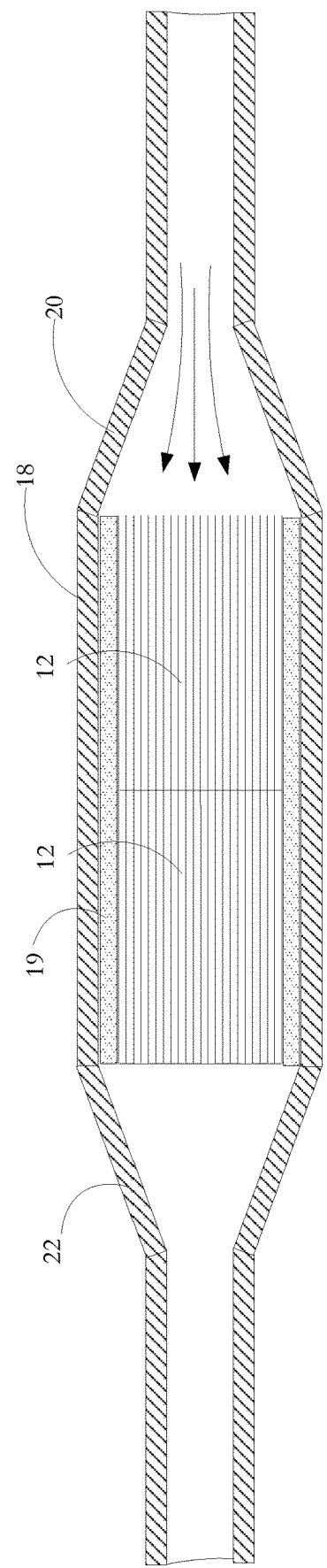
FIG. 2 is a longitudinal section through a known prior art arrangement of a catalytic converter.

As is also known in the art, the bricks are immersed in a wash-coat containing a base material suitable for ensuring adherent coating onto the cured ceramic material and entrained catalyst material for use in promoting specific chemical reactions. The outside of the ceramic substrate unit is masked to inhibit the catalytic layer from coating the outside of the unit. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. Following drying of the wash-coat, the brick is mounted within a casing 18 and expansion blanket 19 as shown in FIG. 2.

The casing 18 includes a front end adaptor section 20 for fixing to an upstream part of a vehicle exhaust pipe (not shown) and a back end adaptor section 22 for fixing to a downstream part of the exhaust pipe. The unit shown in FIG. 2 has two bricks 12 mounted in series, the bricks having catalytic coatings which are different from one another so as to promote or accelerate different reactions within gaseous exhaust emissions. Thus, a first brick might have entrained platinum and palladium catalysts for promoting high temperature conversion of carbon monoxide to carbon dioxide. The second brick might have entrained rhodium catalyst for promoting high temperature conversion of oxides of nitrogen to nitrogen and oxygen. Additional bricks may be mounted in the casing to promote yet other reactions. In addition, the bricks may be separated and have their own casing.

Figure 3:
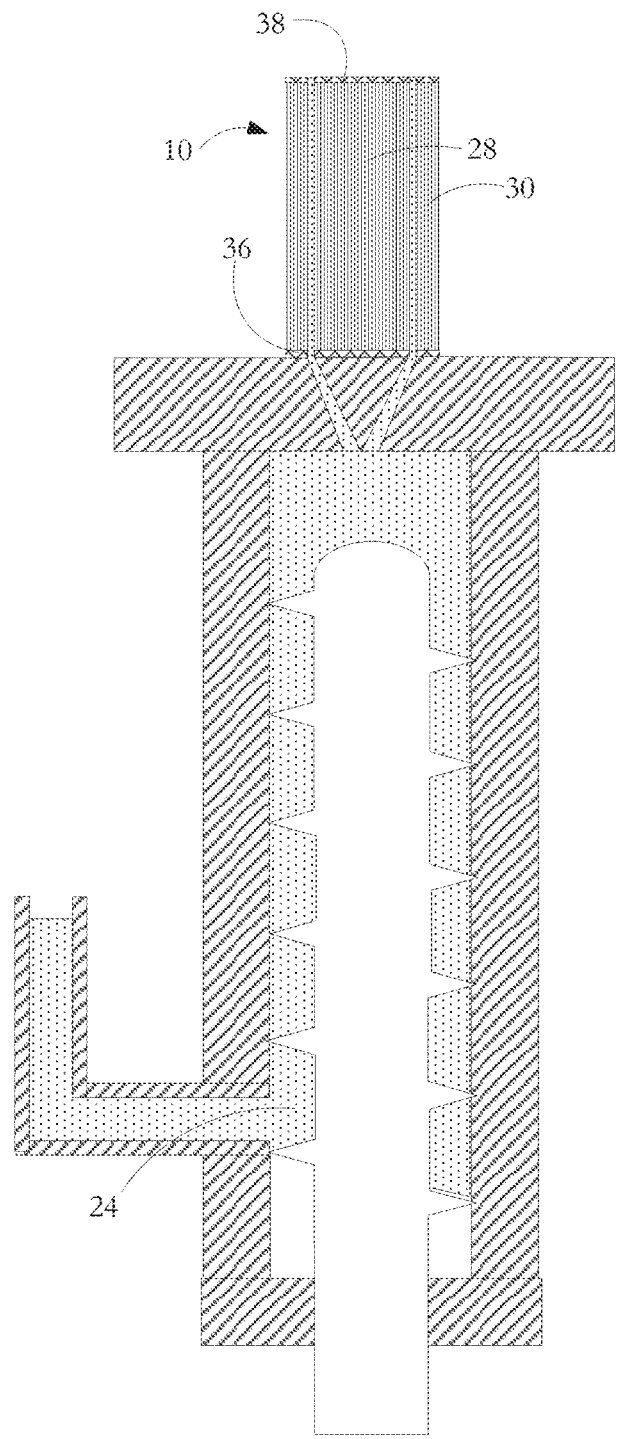
FIG. 3 is a sectional view through an insulation injection station used in a process according to an embodiment of the invention.
Figure 4:
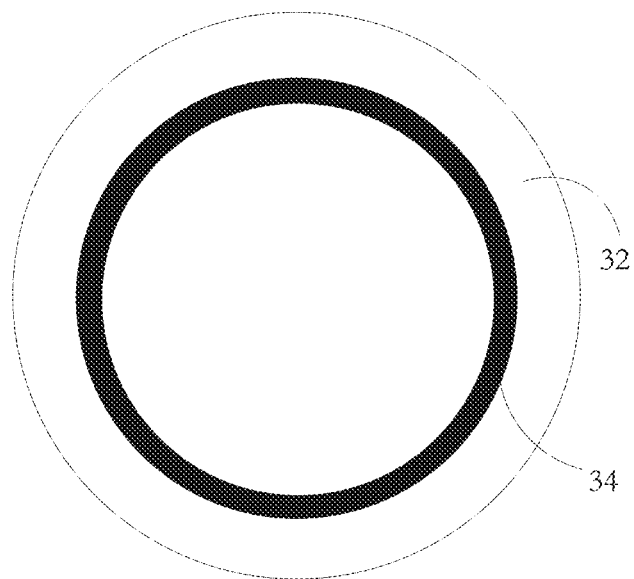
FIGS. 4 and 5 are end and sectional views respectively of an insulation injection die for use in a process according to an embodiment of the invention.
Figure 5:
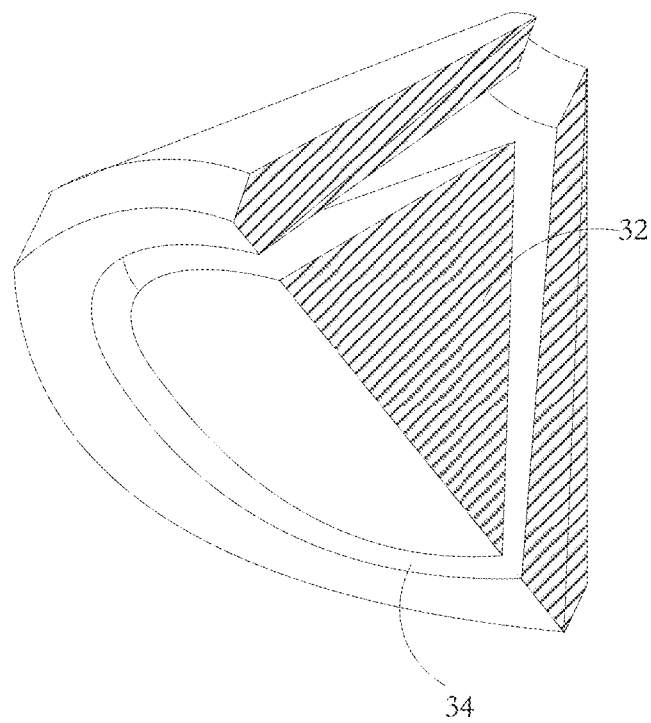

Referring to FIGS. 3 to 5, in a process according to one embodiment of the invention, insulating material 24 is injected upwardly into a unit 10 of the ceramic extrusion after it has been cut from the extruded stock and after it has been cured and fired. The insulation material 24 is injected into selected ones of the elongate passages 14 so that, as shown in FIGS. 6 and 7, the selected cells 14 are filled throughout their lengths. The passages or cells 14 are selected so that, once the insulation material 24 is cured, it forms a thermal boundary layer 26 between a core zone 28 and a peripheral zone 30 in the catalytic converter brick 12.

Referring back to process FIGS. 4 and 5, in one process example, an injection head 32 is made of stainless steel and has an external diameter of 3.66 inches matched to the 3.66 inch diameter of the substrate. The injection head 32 has an annular injection aperture 34 having an internal diameter of 2.5 inches and an outer diameter of 2.8 inches to produce an annular slot width of 0.15 inches. Alternative forms and dimensions of injection head 32 are used for different substrate cross sectional areas and shapes. In addition, alternative ring aperture positions and widths can be adopted to obtain a differently positioned thermally insulating boundary layer 26 or a different thickness of layer. Other suitable materials can be used for the injection head provided that they are dimensionally stable over time and when subjected to temperature variation, and provided also that the material of the injection head 32 (or at least the interior of the injection path within the die) does not react with the insulation material or adhere to it.

Robotically controlled handling equipment is used to move and clamp the injection head 32 and the substrate unit 10 in a precise registration so that selected cells 14 of the substrate are optimally aligned with the ring aperture 34. Photoelectric sensors having light emitters and detectors at opposite ends of the substrate are used to direct super collimated light along the passages during the registration step. The level and location of detected light are used to develop control signals to the handling equipment to achieve fine adjustment of an initial registration position of the injection head 32 relative to the ceramic substrate unit 10 so as to obtain the cleanest possible division between cells 14 that are to be filled with injected insulation 24 and cells that are, to be free of insulation. This is supplemented by a machine cut gasket layer 36 at the injection face of the injection head. The gasket layer has a ring shaped aperture that generally matches the ring aperture of the injection head but, as shown in FIG. 10, has a perimeter which is specifically matched to the boundaries of the cells to be filled. The gasket also accommodates any excursion from planarity of the end surface of the ceramic substrate into which insulation is to be injected.

By directly injecting the honeycomb cells or passages 14, the structural integrity of the ceramic substrate is minimally affected. The small cell size (as shown, 0.04×0.04×6 inches in the 400 cells per square inch substrate), is quite difficult to inject over the full 6 inch length of a ceramic unit 10. Use of the low viscosity mastic insulation material 24 enables the insulation to flow the full 6 inches length of the unit at a relatively low injection pressure of the order of 650 psi. However, through a combination of surface tension, viscosity, adhesion properties of the insulation, and porosity and surface roughness properties of the substrate ceramic, the insulation does not flow out of the cells once injected.

As previously mentioned, to achieve a clean injection surface, a precision gasket layer 36 is present at the injection face of the injection head 32 as shown in FIG. 3. The injection head and the substrate are mounted so that the head is pressed against the substrate unit to squeeze the gasket 36 so that it seals against the substrate unit to prevent leakage of insulation 24 into cells 14 adjacent those selected for injection. To achieve a clean surface at the other end of the substrate, either the area of non-selected cells is temporarily masked off as shown at 38 or a similar gasket arrangement is used on the substrate exit end.

The insulation material in its injectable form is an essentially homogeneous, very low viscosity masticated mixture of glass fibres, clay slurry, polymer binders and water. The low viscosity mastic insulation is readily injectable and exhibits Newtonian fluid properties. The mastic retains its shape upon dispensing and so remains within the selected tubular passages upon injection. The low viscosity allows the mastic insulation material to be injected into all corners of the honeycomb cellular space and the adhesion properties of the binder component mean that it strongly adheres to the ceramic surfaces even with its low viscosity. For small cell sizes of the order of 900 cells/passages per square inch, frictional resistance to the injected insulation flow is high and corresponding adjustment of component contents is required to modify the rheology of the insulation to enable effective injection.

The insulation material has a maximum service temperature of the order of 1200 degrees Centigrade and so is not damaged at the normal upper operating temperature of conventional catalytic converters which is of the order of 1000 degrees Centigrade. The insulation material is durable and, while not as strong as the ceramic substrate, is well able to survive the combination of heat and vibration produced in regular operation of an upstream internal combustion engine. The insulation is relatively inert and, by its fibrous nature, resists thermal shocking. Once cured, the insulation forms a network of interlaced glass fibres that are bonded together. The fibres are flexible and allow the insulation to readily expand and contract upon thermal cycling without creating failures or defects. The insulation material is engineered for very low thermal conductivity to match the slightly higher thermal conductivity of the ceramic. While reasonably close in performance to the surrounding ceramic, the mastic insulation material is designed to relax relative to the ceramic substrate to allow the insulation to bend and flex with the ceramic substrate but still retain its shape and not degrade over time and temperature. The binder materials provide good adhesion between the mastic and ceramic, this being enhanced by the high interfacial surface area between the insulation and ceramic as a function of the enclosed volume of insulation material. The solid bond between the mastic and ceramic produces an integral composite structure.

The substrate core diameter, i.e. the diameter of the core cylindrical zone 28 inside the thermal insulation boundary layer 26, is matched to the exhaust pipe diameter. In one example, the core zone 38 has a diameter of 2.5 inches for automobile converter units mounted close to the engines. In another example, where converter units are located underneath the vehicle and at an appreciable distance from the engine, the core diameter is of the order of 2.75 inches. The majority of exhaust gas flow through the converter is through the core zone 28 with the proportion of that flow through the center being directly related to the inlet exhaust diameter.

While in the preferred embodiment, the illustrated ceramic substrate unit 10 has a circular section and square cells, it will be appreciated that other substrate sectional shapes are possible such as rectangular, elliptic, oval, etc., for substrates having reduced ground clearance requirements, and other cell sectional shapes are possible such as hexagonal, triangular, circular, etc.

The wash-coating is typically a single step process with the substrate being dipped into a tank containing a precious metal slurry made up of platinum group metals (PGM), such as palladium, platinum and rhodium, in a clay suspension. The clay suspension carries the PGMs and provides a bonding surface between the PGMs and the ceramic substrate. Substrate lengths may be dipped multiple times to increase the PGM loading. The wash-coated parts are heated to 650 degrees Centigrade to cure the clay suspension. Substrate units 10 typically of the order of 6 inches in length are dipped in the catalyst solution and are then cut into smaller bricks 12.

The mastic insulation material used in the production of the bricks 12 is microwave cured after being injected. The curing process is designed to heat the injected brick beyond the curing temperature of the insulation: 100 degrees C. for the exemplary mastic insulation. This temperature is needed in order to eliminate water and liquid binders and to activate a polymerization process which converts the mastic insulation from a paste to a solid. The curing dynamics are set so that the insulation material as it solidifies forms a matrix of interconnected pores which contain the vaporizing water, the pores being of the order of 1.5 millimetres and less across. During curing, water vapour flows through the matrix and through the walls of the ceramic honeycomb walls before escaping from the unit. By appropriately tuning curing parameters, including water content of the injected insulation and speed of curing, a pore size and distribution is obtained which offers the best optimization for structural strength and for effectiveness of thermal insulating barrier.

Once cured, the insulation is structurally stable, does not revert back to a paste form in the presence of water, and is essentially unaffected by a temperature of the order of 1000 degrees C. or by temperature cycling between room temperature and 1000 degrees C. As the water and liquid binder gases off, the ceramic unit stops absorbing microwave radiation and so stops heating up with the temperature not getting significantly hotter than the 100 degrees C. level required for curing. The previously fired honeycomb ceramic is largely transparent to the microwave radiation.

It is noteworthy that microwave curing is faster and more efficient than conventional convection curing (air curing or oven curing). Microwave curing of the injected region takes less than 10 minutes in a 1 kilowatt microwave unit. Faster curing can be achieved using one or more industrial grade microwave generators with such generators being used to cure several units simultaneously. However, the rate of curing must not be so fast that a rapid vaporization of water and a relatively slower solidification of the insulation and binders cause loss of integrity in the structure; i.e. not so fast that the vaporizing water is explosively ejected causing loss of homogeneity in the cured insulation or damage to the honeycomb ceramic. In comparison, oven curing the same injected brick structure takes of the order of 3 hours in a 910 kilowatt oven. This represents a significant saving in time and energy costs compared with conventional oven curing. In this respect, a disadvantage of oven curing is that the mastic insulation is entrained inside the ceramic honeycomb matrix which must be heated to the curing temperature in order to transfer the heat by conduction to the insulation. The honeycomb ceramic brick is highly insulating owing to the nature of the material itself and the cellular geometry which together make for inhibited heat transfer resulting in long curing times and wasted heat. In the case of microwave curing, the ceramic honeycomb matrix is virtually invisible to microwave so that the microwave energy goes straight to the insulation to effect the curing process. The insulation quickly heats up and cures with very little heat loss to the ceramic honeycomb. The thin cylindrical shell sections lend themselves particularly to microwave curing. Thus, microwave curing has a maximum penetration depth which is not far below the surface of the mastic insulation paste—about 2 millimetres or 0.080". The microwaves bombard the thin shell sections from both sides, effectively doubling the penetration depth to about 4 millimetres or 0.160" in total. The injected thermal management zone is about 0.150" thick which is within the 0.160" total penetration depth.

The mastic insulation expands slightly with microwave curing thereby reducing the density of the insulation material but increasing its thermal insulating capacity. Any cured insulation projecting from the end surfaces of the ceramic unit is removed. In the finished product, the pores constitute air pockets that give the insulation its insulating value and produce its low thermal conductivity. The pores are isolated from one another and have a high insulating value in comparison with dense, solid material because heat that transfers to the insulation must circumvent the pores to propagate through the insulation layer. The pore distribution results in relatively circuitous heat transfer routes so that the effective travel distance for heat in transferring from one side of the thermal barrier to the other is greater in the porous material compared to a solid material.

Heat transfer within the insulating barrier is by a combination of convection, radiation and conduction. In the first case, convection occurs by movement of air molecules in each of the pores as convection of air in a pore close to the hot ceramic causes the pore to heat up. The pore then transfers heat to adjacent pores and so on through the pore matrix. Radiation heat transfer becomes significant when the converter is very hot. Here, a hot face of a pore radiates to the opposite face of the pore regardless of air movement. The presence of the porous insulation reduces the rate at which heat is radiated across each passage in comparison with an empty passage. Thus, with open passages, the cells are oriented in a given direction (direction of heat transfer) and there is minimal surface area for intense radiation (energy per unit area). In contrast, porous insulation is randomly oriented (heat travels in all directions) and has a large surface area, meaning lower radiation intensity. Conductive heat transfer also takes place but is less of a factor in the thermally insulation character of the barrier. Typically, the thermal conductivity of the ceramic is 4 W/mK and of the insulation is 0.25 W/mK.

The microwave curing has other benefits compared with conventional curing methods such as air curing and oven curing. Thus, air curing produces a contraction of the mastic insulation material which means that, after curing, the barrier cavity is not completely filled to the ends of the unit. This means that there will be some reduction in insulating capacity unless an additional process step is taken to fill the barrier cavities to the unit ends.

Unlike microwave curing, neither air curing nor oven curing produces a uniform pore size or pore distribution. The nature of the pores is important to the structural integrity of the unit and to its thermal insulating properties. During microwave curing, the pores are formed by vaporization of liquid components in the mastic insulation, with the nature and size of the pores that are formed being dependent on curing process parameters including the curing rate of the insulation in the ceramic unit. The liquid components are water and organic binders, the latter being essentially polymer chains in suspension. Upon heating, the major liquid component, water, vaporizes while the polymer component remains. When the water vaporizes, water droplets undergo expansion as they change state. Owing to the mastic nature of the insulation—it is tacky and has high surface tension— vapour bubbles are trapped in the solidifying insulation so as to produce the pores. Curing parameters, chiefly the water content and the rate of curing, are selected to create uniform pore size and distribution.

In contrast, air or oven curing are slow procedures with the mastic insulation remaining liquid for a long time which allows it to flow and coalesce. If such conventional curing processes are used in this application, the insulation tends to migrate towards the walls of the ceramic matrix. Consequently, initially formed small pores become large pores which may span the full width and a substantial part of the length of the thermal barrier. While large pores offer high thermal insulation, they are not good for structural integrity because it may mean that the two faces of the thermal barrier are not physically bonded together. Slow heat transfer also means that pores are produced at the ends of the unit or brick before they are formed over the middle region. This, in turn, results in non-uniform pore size and pore distribution, with the pores at the centre of the cavity being smaller and higher in number than at the ends of the cavity where pores are fewer but larger. Small pore size means denser material and lower insulating capacity. Large pore size may result in lower structural integrity. Microwave curing heats the insulation so fast that coalescing is not an issue. The mastic insulation heats and cures resulting in small pores of uniform size and distribution.

A thermal barrier cannot be effectively injected and fired during the manufacture of the ceramic honeycomb units because the honeycomb structure is extruded as softened clay. Consequently, injecting insulation, even at very low pressure into the honeycomb causes the walls to deform with the insulation intruding into and blocking adjacent passages of the honeycomb. Although the embodiment describes the curing of an insulating barrier injected into a conventional honeycomb ceramic unit, having a uniform matrix of cells across its cross section, it will be appreciated that microwave curing can be used for ceramic units which are formed in alternative processes. In one alternative, a conventional honeycomb unit is machined to cut slots into the matrix that form the outline of the thermal barrier into which mastic insulation is injected before curing. In another alternative, special dies are used to extrude the ceramic honeycomb so that it has slots formed in the extrudate. The mastic insulation is then injected into the slots of the cured extrusion and the injected insulation material is microwave cured.

The injected insulating material is cured to drive off water from the mastic insulation and to activate polymer binders in a polymerization process that solidifies the mastic material at its injected position. The binders in the insulation polymerize in a one-way reaction so that any subsequent wetting of the cured insulation does not return it to its low viscosity state. While the curing process is effected at low temperature of the order of 650 degrees Centigrade, the resulting thermal boundary can survive automotive application temperatures of the order of 1000 degrees Centigrade.

Because of the insulating nature of the ceramic, the mastic insulation inside the ceramic substrate unit 10 is not easily accessed for curing purposes and therefore cannot be easily and rapidly cured using conventional heating methods. The insulation within the ceramic units is therefore cured by microwave radiation. Microwave absorbent materials in the insulation—water and liquid binder—are energized by the microwave radiation to heat such materials by atomic vibration. The solid components including the ceramic are essentially transparent to the microwave energy. The microwave radiation penetrates from all sides of the unit 10 simultaneously curing the insulation in the boundary layer quickly and evenly. As the temperature rises through 100 degrees Centigrade, the water vaporizes and the binder materials undergo polymerization. The maximum microwave penetration depth in the insulation material is about 0.08 inches. A suitable thermal barrier boundary layer is one or two cell widths in thickness corresponding in a 400 cells per inch honeycomb structure to a thermal insulation boundary thickness of 0.04 inches for one cell or 0.08 inches for two cells. Thus, considering that curing radiation is directed from both sides of the boundary layer 26, the insulation thickness to be cured is less than the total depth of microwave penetration combined from both sides of the layer, so ensuring curing throughout the thermal boundary layer. While curing of a unit is rapid—of the order of 30 seconds—the driving out of water vapor and binder gases does not develop internal gaseous pressures sufficient to damage the cured insulation. If there is any slight distension of insulation at the end surfaces of the unit, it can be quickly machined away. In use as a catalytic converter, the high temperature of the bricks causes any remaining organic binder to be driven off leaving a porous inorganic matrix of glass fibres (of the order of 90% silica by weight) and ceramic.

The binder polymerization produces a one-way reaction where the solidified insulation cannot be converted back into a mastic state by adding water or other liquids. The ceramic substrate is virtually invisible to microwave, as there are no absorbent materials present in the ceramic. This makes for an efficient curing process as the microwave energy is selectively absorbed by injected insulation material. The microwave curing produces a regular pore structure which is desirable for achieving high performance in terms of presenting a thermal barrier to heat transfer between the core zone 28 of the converter unit 10 and a radially outer zone 30 of the unit.

By injecting the insulation material down the tubular passages 14 of the substrate units 10, the basic initial ceramic honeycomb structure is maintained, together with the properties inherent in that structure. The ceramic honeycomb is brittle so there is very little distortion of the honeycomb walls 16. In particular, the resistance to lateral compression of the basic structure is substantially maintained. It will be noted that by using this particular method, there is no machining of insulation injection cavities into the honeycomb which, regardless of the accuracy of the machining process, might produce stresses and micro-flaws that would weaken the ceramic structure at the machined regions.

As an alternative to injecting mastic insulation into the cells/passages, a powder-based insulation is vibrated into the cells. The powder-based insulation material is similar in composition to the mastic insulation having corresponding ingredients including alumino-silicate powder, glass fibres, polymer binder, and water. In contrast to the mastic insulation which is initially a high viscosity liquid, the powder is a granular solid. The mastic insulation has a moisture level of the order of 40% by weight or more before curing, whereas the powder insulation has a moisture level of less than 15%. The powder-based insulation exhibits almost no flow under the application of pressure. Instead, high frequency vibration (3450 CPM or less, CPM—cycles per minute) is applied to fluidize the powder which then flows under gravity into the honeycomb so as to fill the cells from the bottom up. Similar to the mastic, a template gasket can be used to define the cells that are to be filled from those that are to remain empty. The gasket has openings that align with cells to be filled/blocked and blocks access to cells that are to remain open/clear. Additional vibration is used to encourage compacting of the powder after it falls into the cells if gravity alone is not enough to ensure a desired level of fill density of the cells so as to achieve the desired integrity of the insulation after curing. Proper filling is achieved when large air pockets have been vibrated from the cells. Whereas tiny air pockets assist the insulating value, excessively large air pockets would have an adverse effect on insulating value. Vibration helps remove the larger air pockets, with more powder insulation then filling the areas from which the larger air pockets are removed. Mechanical locking of adjacent particles is desirable as the powder reaches full settling in the uncured (or green) state as it means that there will be corresponding high strength of the insulation matrix obtained after Curing is performed by microwave or convection oven heating to activate the polymer binder in the powdered insulation. This locks the insulation to itself and to the cells walls. Curing is essential so that the insulation does not separate from the catalytic converter substrate during handling in assembly or after the converter is installed and is being used in an internal combustion engine.

Powder insulation particle size is important for proper fluidization and filling of the honeycomb cells. A particle size less than 30 mesh (0.033 inch diameter) is preferred but powder down to 100 mesh in size can be contemplated. In fact, a combination of large and small particle sizes makes for good compaction as the small particles fill interstitial voids between the larger particles. Particles larger than 30 mesh are undesirable as the particle size is on the order of the cell diameter and could block the cell opening preventing insulation from getting into the cell, or become wedged within the cell and inhibit proper filling.

The embodiment of FIGS. 6 and 7 shows a single annular insulating boundary layer 26 extending throughout the length of the substrate unit 10. It will be appreciated that variations in this structure are envisaged depending on desired thermal heat flow transfer characteristics. For example, in one alternative, the insulating layer 26 can be interrupted in its circumferential and/or longitudinal extent so that a thermal barrier exists at certain interface regions between the core zone 28 of the component and the peripheral zone 30, but no thermal barrier is present at other parts of the interface. In another alternative, a plurality of thermally insulating layers can be injected; for example, as a concentric series. In yet another alternative, particularly for insulating wall forms adapted to a non-cylindrical substrate unit 10, a non-cylindrical thermal boundary layer 26 may be injected.

In a manufacturing environment, the ceramic substrate units are moved from an unpacking center by an in-feed conveyor to a process site. Finished items are moved from the process site on an out-feed conveyor to a packing center. The process site has several process stations including a first weighing station, a visual inspection station adapted to view ceramic unit ends, an insulation injection station, a microwave curing station, an output weighing station and an output visual inspection station. The substrate units are moved between stations using robotic pick heads with the stations incorporating placement reference means for accurate location of the blanks suited to the particular process step.

While the preferred embodiments illustrated use a ceramic substrate, the principle of the invention can be adopted with converter substrates made of other materials such as stainless steel. In the case of stainless steel, before injection of insulation takes place, the substrate units are formed by roll crimping/corrugating a sheet of stainless steel and then winding the sheet into a tight cylinder.

Although less preferred because of potential damage to the ceramic substrate, in an alternative aspect of the invention, one or more cavities for the boundary layer(s) is removed by machining away the walls of selected ones of the cells 14 so that when the insulation material is injected into the ceramic unit 10, it fills a barrier cavity as shown at the detail of FIG. 7 rather than, as shown in the FIG. 8 detail associated with the process of FIGS. 3 to 5, forming an interstitial matrix with the walls 16 of the selected cells 14. In the machining process, a computer numerical control (CNC) machining process is used with tungsten carbide cutters being directed from opposite ends of the unit to maximize linearity. The machining is implemented so as to leave islands of the ceramic structure intact so as to keep the substrate in one piece. A suitable insulation injection die for use with this structure also has connecting ribs between several arcuate die aperture elements so that the insulation material is not injected at the islands.

Figure 12:
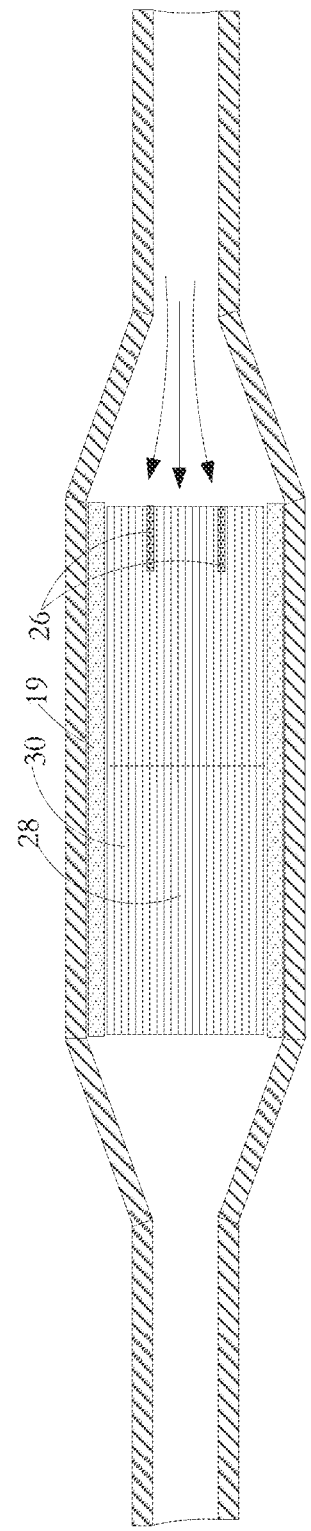
FIG. 12 is a longitudinal section through a catalytic converter according to an embodiment of the invention.

In another embodiment of the invention as illustrated in FIG. 12, some, but not all, of the length of the ceramic unit over the area of selected passages is filled with mastic insulation and then microwave cured. As shown, the insulation is injected to occupy the input end of the unit, with rest of the unit length constituting an air gap or gaps. The insulation can alternatively be injected a short length into both ends of the unit. The remaining air gap or gaps offers satisfactory thermal insulating properties, although not preferred in comparison with a unit filled along its full length with the cured mastic insulation.

Figure 11:
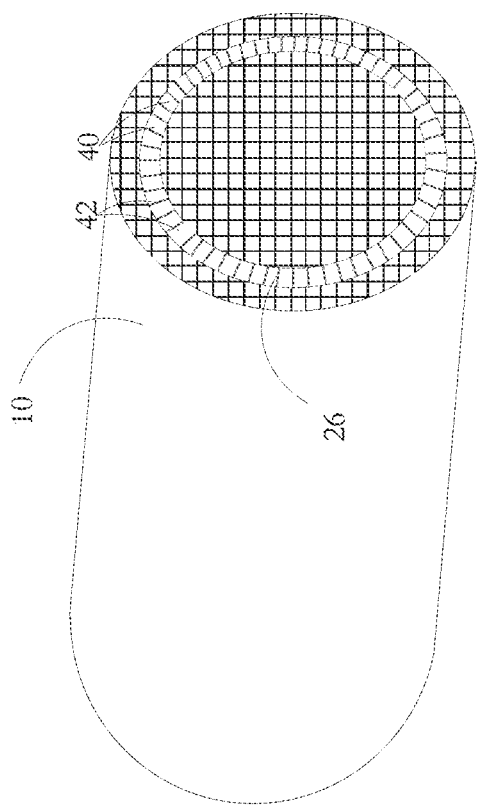
FIG. 11 is a perspective view showing a ceramic substrate unit according to an embodiment of the invention.

In an alternative embodiment of the invention as illustrated in FIG. 11, a number of cavities 40 for the insulation barrier layer are left as a result of the process for producing the honeycomb structure extrusion. The cavities are separated from one another by radially extending walls 42 which provide structural integrity to the extrusion. The extrusion is fired and then injected from one end with mastic insulation so that the insulation fills the chambers and provides a barrier layer which is essentially a hollow cylinder. A suitable insulation injection die for use with this structure has connecting ribs between several arcuate die aperture elements with the ribs aligned with the walls 42. The mastic insulation is then microwave cured.

In the processes described and illustrated, the paste-form mastic insulation is injected from one end of the ceramic unit. It will be appreciated, however, that the mastic insulation can be injected from both ends of a unit. For example, specific passages of a unit can be injected from one end while other passages of the unit are injected from the other end. In a further embodiment, pinholes are formed at the center of a unit to allow the escape of air form the passages and then the mastic insulation is injected from both ends of the unit.

In the process described and illustrated, a gasket is used between the injection die and the ceramic unit to ensure that the mastic insulation is injected into the intended passages. As an alternative to a separate gasket, the die material is formed of slightly deformable material such as high density plastic or PTFE. Consequently, when the die is pressed against the end of the ceramic unit, the die undergoes some rudimentary deformation sufficient to match the die to minor excursions from planarity of the end of the ceramic unit.

It will be seen that the process described with reference to FIG. 3 can be effected on industry-standard ceramic substrates so as to affect the present-day supply chain sequence associated with such catalytic converter units only to a minimal extent. Direct injection of insulation leaves a converter unit design very much like the standard substrate unit currently used in automobile manufacture.

What is claimed is:

1. A process for manufacturing a component for a catalytic converter, comprising taking a ceramic unit prepared by extruding green ceramic product through a die to form an extrusion having a honeycomb substrate structure having a regular array of parallel, linear tubular passages extending along the length of the extrusion, the passages bounded by walls dividing adjacent passages from one another, the ceramic unit being obtained by cutting off a length of the extrusion and curing and firing the cut off length of extrusion, the process further comprising, following the firing, injecting low viscosity insulation material from an end of the ceramic unit into selected ones of the elongate passages so as to block the selected passages over at least a part of the lengths thereof while maintaining all of the walls of the ceramic unit, and curing the injected insulation material to form a thermally insulating barrier, extending over at least a part of the length of the ceramic unit and extending continuously around a central axis of the ceramic unit between a radially inner zone and a radially outer zone thereof, wherein, passages in the inner and outer zones are free of such insulation material, wherein the maintained walls include walls crossing the insulating barrier, and wherein the insulation material in at least some of the passages is injected from said one end to fill the selected passages to the other end of the ceramic unit.

2. The process as claimed in claim 1, wherein the injected insulation material includes components of glass fibres, ceramic slurry and polymer binder.

3. The process as claimed in claim 2, wherein the insulation material is in the form of a low viscosity paste which is injected into the selected passages, the insulation material further including water.

4. The process as claimed in claim 1, wherein the curing of the insulation material is effected by microwave irradiation.

5. The process as claimed in claim 4, wherein the curing is such as to have microwave radiation penetrate from both sides of the insulating barrier.

6. The process as claimed in claim 1, further comprising using a gasket layer on an input end of the ceramic unit, the gasket layer having a first aperture shaped and positioned to limit incursion of the insulation material into passages other than the selected passages.

7. The process as claimed in claim 6, further comprising incrementally relatively moving the die and the ceramic unit to optimize registration of the annular aperture to entrance openings of the selected passages.

8. The process as claimed in claim 1, wherein, following curing, at least a part of the cured insulation material is a matrix of silica.

9. A process for manufacturing a component for a catalytic converter, comprising taking a ceramic unit prepared by extruding green ceramic product through a die to form an extrusion having a honeycomb substrate structure having a regular array of parallel, linear tubular passages extending along the length of the extrusion, the passages bounded by walls dividing adjacent passages from one another, the ceramic unit being obtained by cutting off a length of the extrusion and curing and firing the length of extrusion, the process further comprising, following the firing, injecting a low viscosity material from an end of the ceramic unit into selected ones of the elongate passages so as to block the selected passages over at least a part of the lengths thereof while maintaining all of the walls of the ceramic unit, and curing the injected material, wherein the material has a viscosity that would enable the material to flow 6 inches length along one of the selected passages at an injection pressure of the order of 650 psi.

10. The process as claimed in claim 9, further comprising using a gasket layer on an input end of the ceramic unit, the gasket layer having a first aperture shaped and positioned to limit incursion of the material into passages other than the selected passages.

11. The process as claimed in claim 9, wherein through a combination of surface tension, viscosity, adhesion properties of the material, and porosity and surface roughness properties of the ceramic unit, the material does not flow out of the passages into which it is injected before curing.

* * * * *